(12) United States Patent
Kim et al.

(10) Patent No.: US 6,233,026 B1
(45) Date of Patent: May 15, 2001

(54) MONITOR COMPRISING SNAP ENGAGING BOTTOM SHIELD

(75) Inventors: Ki-Seon Kim; Wan-Sub Lee, both of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/388,533

(22) Filed: Sep. 2, 1999

(30) Foreign Application Priority Data

Feb. 13, 1999 (KR) .................................................. 99-5282

(51) Int. Cl.⁷ ...................................................... H04N 5/64
(52) U.S. Cl. ............................ 348/836; 348/825; 312/7.2
(58) Field of Search .................................... 348/836, 825; 312/7.2, 223.1, 223.2; 361/681, 682, 683; 248/917, 918

(56) References Cited

U.S. PATENT DOCUMENTS

| | | | | |
|---|---|---|---|---|
| 4,820,224 | * | 4/1989 | Lemche ............................. | 348/825 X |
| 5,305,110 | * | 4/1994 | Taki et al. ............................ | 348/836 |
| 5,363,150 | * | 11/1994 | Kojima ................................. | 348/836 |
| 5,575,545 | * | 11/1996 | Wang ................................. | 348/836 X |
| 5,682,300 | * | 10/1997 | Sung ................................. | 312/7.2 X |
| 5,699,132 | * | 12/1997 | Adachi et al. ..................... | 348/825 X |
| 5,844,635 | * | 12/1998 | Kim ................................. | 348/825 X |
| 5,863,106 | * | 1/1999 | Beak ................................. | 312/7.2 |
| 5,900,920 | * | 5/1999 | Lee et al. ............................ | 348/836 |
| 5,969,776 | * | 10/1999 | Han ................................. | 348/836 |
| 5,990,985 | * | 11/1999 | Kim ................................. | 348/836 |
| 6,018,375 | * | 1/2000 | Lim ................................. | 348/836 X |
| 6,034,745 | * | 3/2000 | Cho ................................. | 348/836 |

FOREIGN PATENT DOCUMENTS

2554299 * 5/1985 (FR) ...................................... 312/7.2

* cited by examiner

Primary Examiner—Peter M. Cuomo
Assistant Examiner—James O. Hansen
(74) Attorney, Agent, or Firm—Robert E. Bushnell, Esq.

(57) ABSTRACT

A monitor with an easily attachable and detachable bottom shield. The monitor comprises a front case, a cathode ray tube installed at a rear part of the front case, and a pair of snap members protruding from the front case. The monitor also has a pair of supporting members supporting the cathode ray tube thereon. A pair of guide rails protrude from the rear side of the front case. The bottom shield comprises a bracket with through holes formed at predetermined locations for receiving the snap members. Protruding ribs are formed on the bottom shield and slide on the guide rails when assembling the monitor.

23 Claims, 6 Drawing Sheets

MONITOR COMPRISING SNAP ENGAGING BOTTOM SHIELD

CLAIM OF PRIORITY

This application makes reference to, incorporates the same herein, and claims all benefits accruing under 35 U.S.C. §119 from my application MONITOR COMPRISING SNAP ENGAGING BOTTOM SHIELD filed with the Korean Industrial Property Office on Feb. 18, 1999 and there duly assigned Ser. No. 5282/1999.

BACKGROUND OF THE INVENTION

1. Technical Field

The present invention relates to a monitor, and specifically to a monitor comprising a bottom shield which easily engages with a front case.

2. Related Art

The term "monitor" generally refers to an apparatus displaying letters, symbols or diagrams by fluorescent materials which glow when hit by electrons emitted from a cathode ray tube according to image signals. In the monitor, a bottom shield with a printed circuit board contained therein is installed, and carries out various functions by sending out image signals or electronic signals to the cathode ray tube. Such a bottom shield is secured to a front case by means of various engaging members at the lower portion of the front case.

However, such structure of the bottom shield has such problems as extended assembly time due to complexity in assembly operation, which is caused by engagement of screws, and weakening of the securing force of the screws between the bottom shield and the front case caused by impact and vibration while moving the cathode ray tube during the assembly procedure. In addition, the securing of the cathode ray tube using only supporting bosses does not provide sufficient supporting force for the weight of the cathode ray tube.

SUMMARY OF THE INVENTION

An object of the present invention is to provide a monitor comprising a bottom shield which can easily be secured to and removed away from a front case.

Another object of the present invention is to provide a monitor having improved reliability by preventing vertical and horizontal vibration of a bottom shield.

In order to achieve the above objects, a monitor according to the present invention comprises a front case, a rear case, a bottom shield, and a cathode ray tube disposed therebetween, and has structures between the bottom shield and the front case.

Specifically, a pair of snap members protruding from both lower rear corners of the front case are provided, and a pair of through holes are formed on the bottom shield at locations corresponding to the pair of snap members. The through holes receive the snap members to secure the bottom shield and the front case.

A pair of supporting members supporting the cathode ray tube on an upper surface thereof are provided. The supporting members are spaced away from the snap members and protrude from rear corners of the front case.

Preferably, the snap members comprise a first snap pin whose sectional profile is a semi-circle, and a second snap pin placed below and spaced away from the first snap pin. The second snap member has a stopping flap on a peripheral surface of an upper end. The stopping flap prevents the snap member from detaching away from said through holes when the snap members are inserted into the through holes.

A pair of guide rails protruding from the rear surface of the corners of the front case is also provided. A pair of protruding ribs corresponding to the guide rails can be provided on the bottom shield. The ribs abut said guide rails to guide the bottom shield when securing the bottom shield onto the front case.

Preferably, surfaces slanted in a predetermined angle are provided at a side of the protruding ribs so that, when the snap members are received in the through holes, the inner peripheries of the guide rails abut the slanted surfaces to facilitate engagement.

The supporting member can comprise a vertical plate and a horizontal plate directly contacting the cathode ray tube. The horizontal plate is connected to said vertical plate.

The bottom shield can comprise a printed circuit board, and a metal bracket receiving the printed circuit board therein.

According to another aspect of the monitor according to the present invention, the monitor comprises a front case having a pair of guide rails protruding backwards from corners of rear side thereof; a cathode ray tube installed at the back side of the front case; a pair of supporting members providing support surfaces supporting the cathode ray tube thereon, the supporting members protruding from the corners of a rear side of the front case; and a bottom shield having a pair of protruding ribs abutting the guide rails and guiding the bottom shield when the bottom shield engages the front case.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

The present invention will now be described in detail referring to the accompanying drawings. However, the embodiments hereinafter described should be interpreted as illustrative and in no sense limiting.

Figure 1:
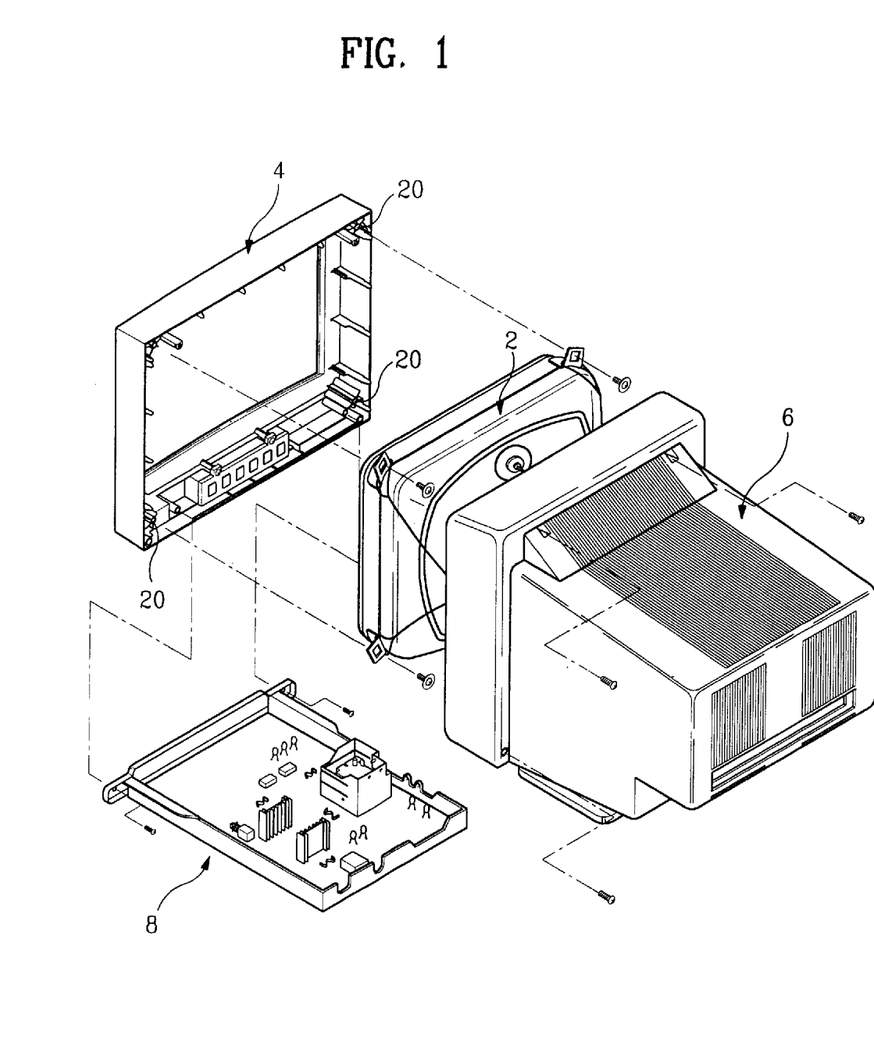
FIG. 1 is an exploded perspective view of a monitor showing a bottom shield installed on the front case by engaging screws.
Figure 2:
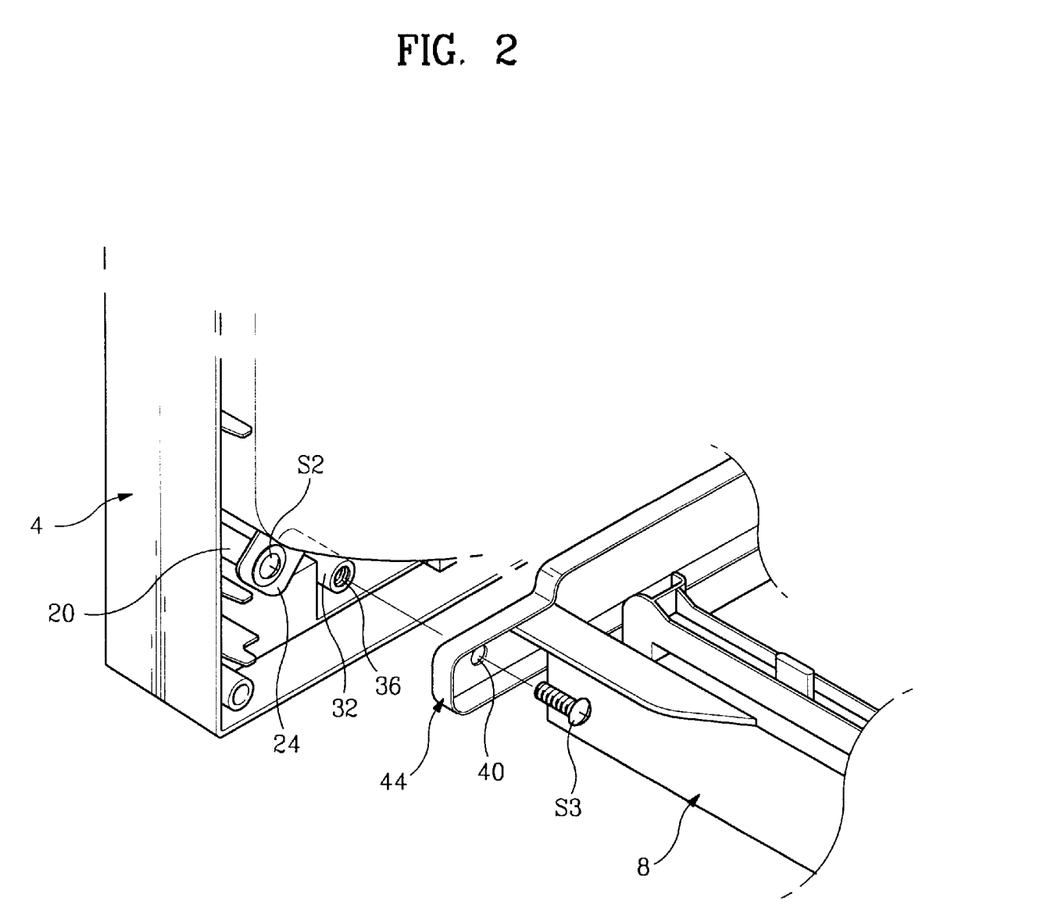
FIG. 2 is an enlarged perspective view showing an engaging structure of the front case and the bottom shield.

FIG. 1 shows an example of a bottom shield engaging the front case of a monitor. FIG. 2 shows the engaging portion of the monitor more specifically.

As can be seen in the drawings, the monitor comprises a front case 4, a cathode ray tube 2 installed at the back side of the front case 4, a rear case 6 assembled to the front case 4, and the bottom shield 8 installed at a bottom portion of the monitor. Ear portions 24 of the cathode ray tube 2 are secured to protruding bosses 20 of the front case 4, thereby installing the cathode ray tube 2 onto the front case 4. The bottom shield 8 is installed onto the lower rear side of the front case 4 by means of engaging screws S3. A plurality of supporting bosses 32 protrude from the lower rear side of both corner portions of the front case 4. Bosses 20 onto which cathode ray tube 2 is installed, and bosses 32 supporting the bottom shield 8 and having receiving holes 36 therein are also provided. A bracket 44 is installed on the front side of the bottom shield 8. Protruding portions with a predetermined width are provided on the bracket 44. Through holes 40 are formed at predetermined locations on the bracket 44. The engaging screws S3 penetrate the through holes 40 and receiving holes 36, and are received therein to install the bottom shield 8 to a lower portion of the front case 4.

However, such structure of the bottom shield has such problems as extended assembly time due to complexity in assembly operation, which is caused by engagement of screws, and weakening of the securing force of the screws between the bottom shield and the front case caused by impact and vibration while moving the cathode ray tube during the assembly procedure. In addition, the securing of the cathode ray tube using only supporting bosses does not provide sufficient supporting force for the weight of the cathode ray tube.

Figure 3:
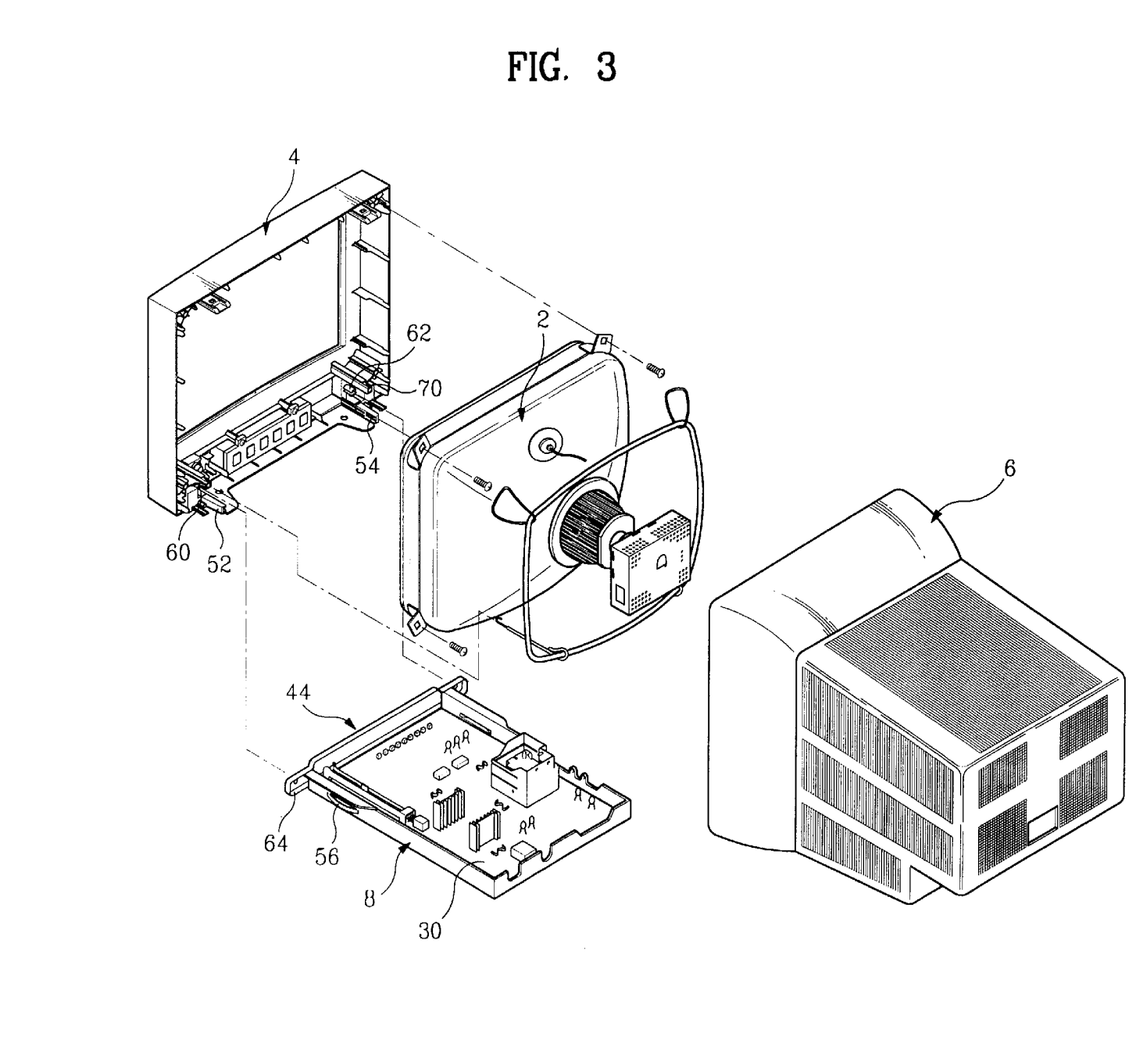
FIG. 3 is an exploded perspective view showing the bottom shield installed on a lower portion of the front case of the monitor.
Figure 4:
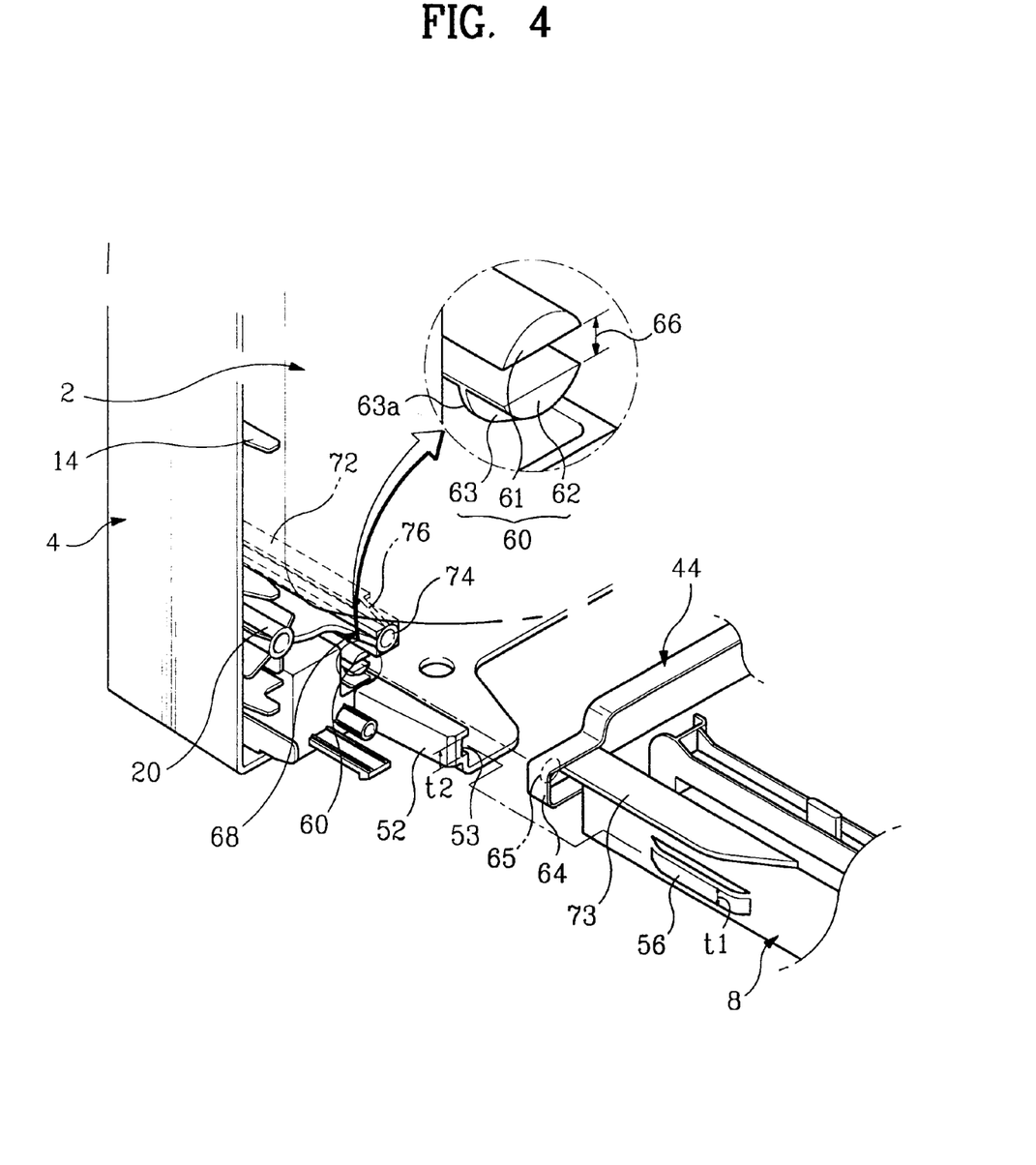
FIG. 4 is an enlarged perspective view showing the engaging portion of the front case and the bottom shield.

FIG. 3 is an exploded perspective view showing a bottom shield of a monitor installed on a lower portion of a front case, and FIG. 4 is an enlarged perspective view showing the engaging portion of the bottom shield and the front case of the monitor.

As can be seen in the drawings, the monitor comprises a front case 4, a cathode ray tube 2 installed on a rear part of the front case 4, a rear case 6 engaging the front case 4 integrally, and a bottom shield 8 installed at the lower part of the monitor.

The bottom shield 8 is installed at the lower part of the front case 4. Snap members 60 are integrally formed at rear corners of the front case 4 in a protruding manner. Since engaging structures for both corners are identical, the engaging structure of only one corner will be explained hereinafter. The snap member 60 consists of resilient material. The snap member 60 comprises a first snap pin 61 having a semicircular sectional profile, and a second snap pin 62 having a semicircular sectional profile. The second snap pin 62 is spaced away from the first snap pin 61. Also, a flap 63 heading downward is formed at the lower surface of the second snap pin 62. A slanted surface 63a is formed at a side of the flap 63. Due to such a structure, when the snap member 60 is inserted into the through hole 65 with the first snap pin 61 and the second snap pin 62 abutting the inner peripheral surface of the through hole 65, the pins 61 and 62 are easily inserted into the through hole 65.

At a location space above the snap member 60, a support member 68 is provided. The support member 68 is integrally formed on and protrudes from the rear side of the front case 4. The support member 68 has a rectangular sectional profile. Within the support member 68, a receiving hole 74 is formed. A vertical plate 76 protrudes from an upper surface of the support member 68. A horizontal plate 72 is formed at an upper surface of the vertical plate 76 and has a plane perpendicular to that of the vertical plate 76. The bottom portion of the cathode ray tube 2 directly abuts the upper surface of the horizontal plate 72, which supports the cathode ray tube 2. The weight of the cathode ray tube 2 is supported by the horizontal plate 72, and that weight is transmitted to the support member 68 through the vertical plate 76. That is, the weight of the cathode ray tube 2 is primarily supported by the ear portions 24 (FIG. 2), and secondarily by the horizontal plate 72 (FIG. 4).

According to size of the monitor, the sizes of the cathode ray tube 2 and the bottom shield 8 also differ. This subjects the size of a gap t (FIG. 6) between an upper end portion of the bracket 44 and a lower end portion of the cathode ray tube 2 to change. By changing the vertical height of the support member 68, suitable preparation can be made for change in the size of the gap t. Below the snap member 60, a guide rail 52 is formed. The guide rail 52 protrudes backward from the rear side of the front case 4. The guide rail 52 has a rectangular cross-sectional profile (FIGS. 4–6), and a groove 53 with predetermined width t2 is formed at a side of the guide rail 52.

Figure 6:
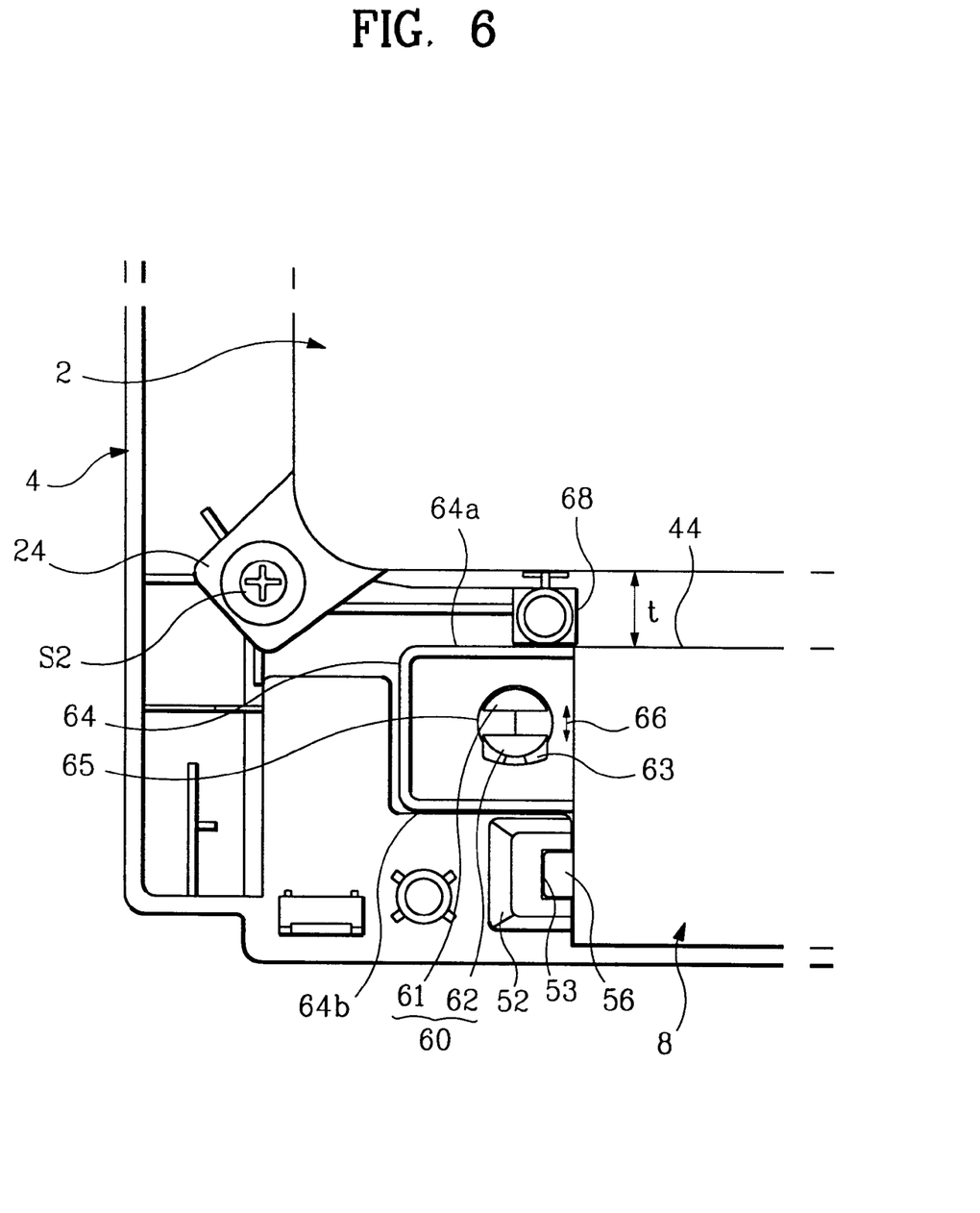
FIG. 6 is a rear view showing the bottom shield installed on the front case.

A bracket 44 is installed at a front portion of the bottom shield 8 (FIGS. 4 and 6). At both ends of the bracket 44, portions 64 protruding from both sides of the bottom shield 8 are provided. Through holes 65 are formed at predetermined locations on the protruding portions 64. Protruding ribs 56 are formed on both sides of the bottom shield 8. Therefore, the protruding ribs 56 engage the inner portion of the guide rail 52 when the bottom shield 8 engages the front case 4.

The protruding ribs 56 are inserted into the grooves 53 of the guide rail 52 in a sliding manner. Therefore, the height of the protruding rib t1 must be smaller than the width t2 of the groove 53 formed on the guide rail 52 (see FIG. 4).

At both sides of the bottom shield 8, wing portions 73 are provided, and the ends of wing portions 73 are inserted into the bracket 44. The engagement of the bottom shield 8 and the front case 4 will be specifically explained hereinafter referring to FIGS. 5 and 6.

Figure 5:
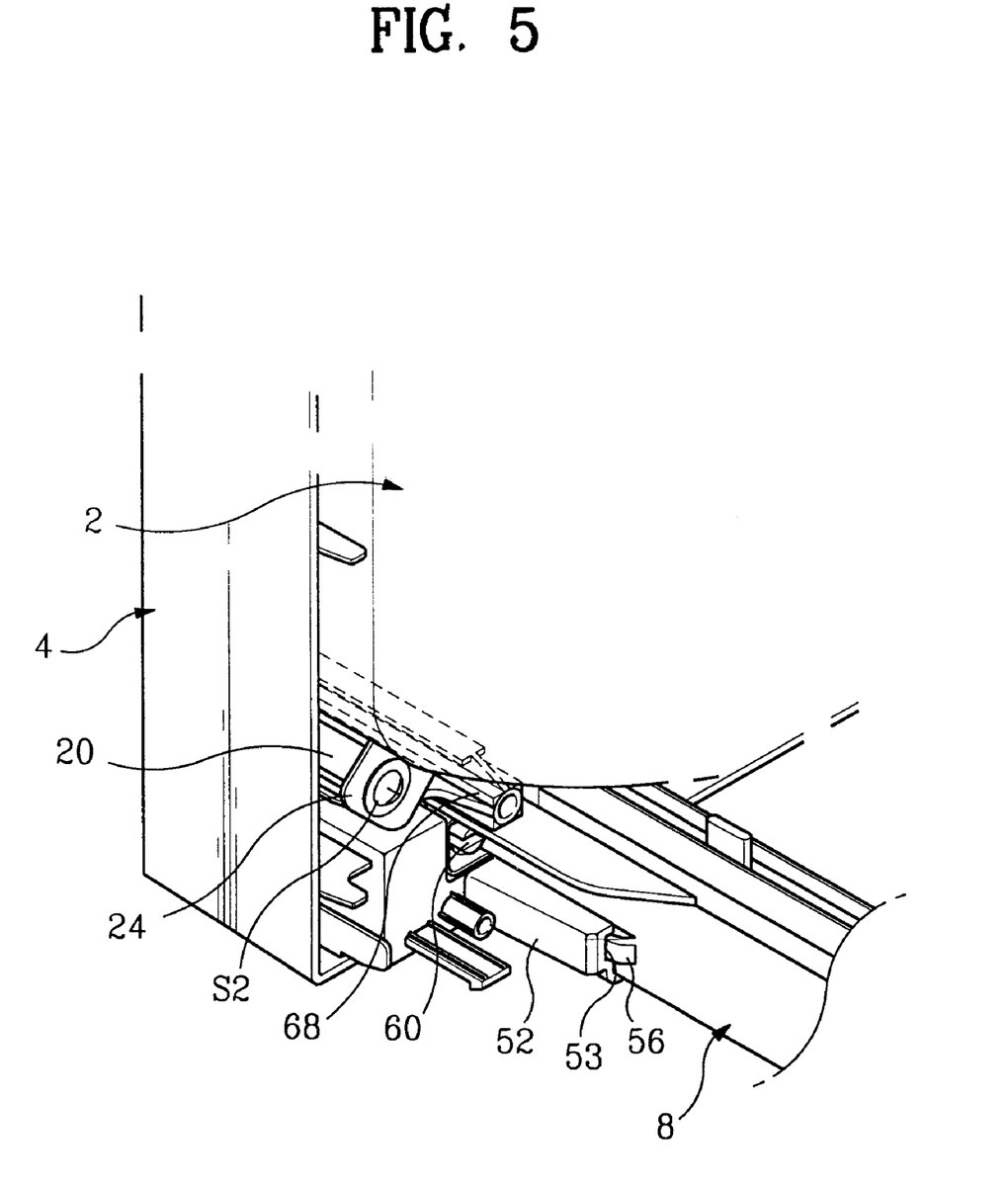
FIG. 5 is a enlarged perspective view showing the bottom shield installed on the front case.

FIG. 5 is an enlarged perspective view showing the bottom shield installed on the front case, and FIG. 6 is a rear view showing the bottom shield installed on the front case.

As can be seen in the latter drawings, the snap members 60 of the front case are inserted into the through holes 65 formed on the bracket 44 of the bottom shield 8. That is, when the through hole 65 abuts the upper end of the snap member 60, the first snap pin 61 and the second snap pin 62 deform, approaching each other. After the pins 61 and 62 are completely inserted into the through holes 65, the pins 61 and 62 return to their normal position by moving in the manner indicated by arrow 66 in FIG. 6. Therefore, the outer peripheries of the first snap pin 61 and the second snap pin 62 contact the inner peripheral surfaces of the through hole 65. The stopping flap 63 of the second snap pin 62 prevents the snap pins 61 and 62 from detaching from the through hole 65.

The protruding rib 56 engages an inner surface of groove 53 of the guide rail 52 formed on the front case 4 in a sliding manner. When the bottom shield 8 is completely assembled to the front case 4, the upper surface 64a of each protruding portion of the bracket 44 abuts the lower surface of the supporting member 68, thereby supporting the supporting members 68. The lower end portion 64b of each protruding portion 64 of the bracket 44 abuts the upper surface of the corresponding guide rail 52. Therefore, the bottom shield 8 is prevented from moving downward.

Hereinafter, the operating mechanism of the preferred embodiment of the present invention will be discussed in more detail.

Referring to FIGS. 4 to 6, when the bottom shield 8 engages the front case 4, each through hole 65 of the bracket 44 is aligned with the corresponding snap member 60 of the front case 4. Then, the bottom shield 8 is pushed into an engaging position. During the push, the lower end portion 64b of the bracket 44 abuts and slides on the upper surface of the guide rails 52, and the end portion of the flap 56 of the bottom shield 8 starts to be inserted into the inner portion of the guide rail 52. Further pushing forward of the bottom shield 8 causes the through holes 65 of the bottom shield 8 to abut outer surfaces of the snap member 60. When the upper ends of the first snap pin 61 and the second snap pin 62 abut the inner peripheral surface of the through holes 65, the first snap pin 61 and the second snap pin 62 approach each other by an exerted force pushing the bottom shield 8. When the front side of the bottom shield 8 makes complete contact with the rear wall of the front case 4, the first snap pin 61 and the second snap pin 62 return to their positions due to resilience. Since the flap 63 of the snap pin 62 secures the bracket 44, the bottom shield 8 is secured to the front case 4.

The protruding ribs 56 are also completely inserted into the grooves 53 of the guide rails 52. The upper surface of the bracket 44 abuts the lower surface of the supporting member 68, while the lower surface of the bracket 44 contacts the upper surface of the guide rails 52. Therefore, vertical and horizontal vibration of the bottom shield 8 due to external force can be prevented. Furthermore, since the cathode ray tube 2 abuts the upper surface of the horizontal plate 72 of the supporting member 68, the weight of cathode ray tube 2 is transmitted to the lower portion and is supported by the supporting members 68. The supporting members 68 are in turn supported by the upper surface of the bracket 44.

When removing the bottom shield 8 from the front case 4, the first snap pin 61 and the second snap pin 62 are deformed, using fingers or tools, in a direction so as to approach each other. Such a deformation reduces the outer diameters of the first snap pin 61 and the second snap pin 62 so as to be smaller than the diameter of the through holes 65. By pulling the bottom shield 8 in a rear direction under the deformation, the snap members 60 are easily removed from the through holes 65. Therefore, the bottom shield 8 is removed from the front case 4.

As discussed above, the snap mechanism is adopted in the bottom shield 8 according to the present invention, providing easy engagement and removal of the front case 4. Furthermore, by supporting the upper and lower portions of the bottom shield 8, vertical and horizontal movement of the bottom shield 8 is prevented, which increases the reliability of the product.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A monitor, comprising:
   a front case having a rear side and a rear portion;
   a cathode ray tube installed at the rear portion of the front case;
   a pair of snap members integrally formed on and protruding from both corners of the rear side of the front case; and
   a bottom shield having a pair of through holes at locations corresponding to respective locations of the snap members, said through holes receiving the snap members to secure the bottom shield and the front case together;
   wherein each snap member comprises a first snap pin, and a second snap pin placed below said first snap pin and spaced away from said first snap pin, said second snap pin having a stopping flap on a peripheral surface of an upper end thereof, said stopping flap preventing said each snap member from detaching from said through hole when said each snap member is inserted into said through hole.

2. The monitor according to claim 1, further comprising a pair of supporting members having upper surfaces for supporting the cathode ray tube thereon, said supporting members being spaced away from the snap members and being integrally formed on and protruding from a rear surface of the corners of the front case.

3. The monitor according to claim 1, wherein said bottom shield comprises a printed circuit board and a metal bracket for receiving the printed circuit board therein.

4. A monitor, comprising:
   a front case having a rear side and a rear portion;
   a cathode ray tube installed at the rear portion of the front case;
   a pair of snap members integrally formed on and protruding from both corners of the rear side of the front case; and
   a bottom shield having a pair of through holes at locations corresponding to respective locations of the snap members, said through holes receiving the snap members to secure the bottom shield and the front case together;
   said monitor further comprising a pair of guide rails protruding from the rear surface of the corners of the front case, and a pair of protruding ribs provided on the bottom shield, said protruding ribs abutting said guide rails to guide the bottom shield when securing said bottom shield onto said front case.

5. The monitor according to claim 4, wherein surfaces slanted at a predetermined angle are formed on sides of the protruding ribs so that, when said snap members are received in said through holes, inner peripheries of the guide rails abut the slanted surfaces so as to facilitate engagement.

6. A monitor, comprising:
   a front case having a rear side and a rear portion;
   a cathode ray tube installed at the rear portion of the front case;
   a pair of snap members integrally formed on and protruding from both corners of the rear side of the front case; and
   a bottom shield having a pair of through holes at locations corresponding to respective locations of the snap members, said through holes receiving the snap members to secure the bottom shield and the front case together;
   said monitor further comprising a pair of supporting members having upper surfaces for supporting the cathode ray tube thereon, said supporting members being spaced away from the snap members and protruding from a rear surface of the corners of the front case;
   wherein each said supporting member comprises a vertical plate and a horizontal plate directly contacting the cathode ray tube, said horizontal plate being connected to said vertical plate.

7. A monitor, comprising:
a front case having a rear side and a pair of guide rails extending rearward from corners on said rear side;
a cathode ray tube installed at the rear side of the front case;
a pair of supporting members providing support surfaces for supporting the cathode ray tube thereon, said supporting members being integrally formed on and protruding from the corners on the rear side of the front case; and
a bottom shield having a pair of protruding ribs formed on respective sides of said bottom shield for abutting said guide rails and guiding the bottom shield when said bottom shield engages the front case;
wherein said bottom shield has through holes formed therein, and wherein said protruding ribs have slanted side surfaces formed thereon so that, when said front case and said cathode ray tube are engaged, inner peripheries of the guide rails abut the slanted side surfaces of the protruding ribs.

8. A monitor, composing:
a front case having a rear side and a pair of guide rails extending rearward from corners on said rear side;
a cathode ray tube installed at the rear side of the front case;
a pair of supporting members providing support surfaces for supporting the cathode ray tube thereon, said supporting members being integrally formed on and protruding from the corners on the rear side of the front case; and
a bottom shield having a pair of protruding ribs formed on respective sides of said bottom shield for abutting said guide rails and guiding the bottom shield when said bottom shield engages the front case;
wherein each said supporting member comprises a vertical plate and a horizontal plate connected to said vertical plate and directly contacting said cathode ray tube.

9. A monitor, comprising:
a front case having a rear side and a pair of guide rails extending rearward from corners on said rear side thereof;
a cathode ray tube installed at the rear side of the front case;
supporting member means having support surfaces for supporting the cathode ray tube thereon, said supporting member means being integrally formed on and protruding from the corners on the rear side of the front case; and
a bottom shield having protruding rib means formed thereon for abutting said guide rails and guiding the bottom shield when said bottom shield engages the front case;
wherein said bottom shield has through holes formed therein, and wherein said protruding rib means have slanted side surfaces formed thereon so that, when said front case and said cathode ray tube are engaged, inner peripheries of the guide rails abut the slanted side surfaces of the protruding rib means.

10. A monitor, comprising:
a front case having a rear side and a pair of guide rails extending rearward from corners on said rear side thereof;
a cathode ray tube installed at the rear side of the front case;
supporting member means having support surfaces for supporting the cathode ray tube thereon, said supporting member means being integrally formed on and protruding from the corners on the rear side of the front case; and
a bottom shield having protruding rib means formed thereon for abutting said guide rails and guiding the bottom shield when said bottom shield engages the front case;
wherein said supporting member means comprises a vertical plate and a horizontal plate connected to said vertical plate and directly contacting said cathode ray tube.

11. A monitor comprising:
a front case having a rear side and a rear portion;
a cathode ray tube installed at the rear portion of the front case;
a bottom shield having through holes formed at corner locations thereon; and
snap member means protruding from the rear side of the front case and insertable into said through holes for securing the bottom shield and the front case;
wherein the snap member means comprises a first snap pin having a semi-circular cross-sectional profile, and a second snap pin disposed below said first snap pin and spaced away from said first snap pin, said second snap pin having a stopping flap on a peripheral surface of an upper end thereof, said stopping flap preventing said snap member means from detaching from said through holes when the snap member means is inserted into said through holes.

12. The monitor according to claim 11, further comprising supporting member means having an upper surface for supporting the cathode ray tube thereon, said supporting member means being spaced away from the snap member means and protruding from said front case.

13. The monitor according to claim 11, wherein said bottom shield comprises a printed circuit board and a metal bracket for receiving the printed circuit board therein.

14. A monitor comprising:
a front case having a rear side and a rear portion;
a cathode ray tube installed at the rear portion of the front case;
a bottom shield having through holes formed at corner locations thereon; and
snap member means protruding from the rear side of the front case and insertable into said through holes for securing the bottom shield and the front case;
said monitor further comprising a pair of guide rails protruding from the rear side of the front case, and a pair of protruding ribs provided on the bottom shield, said protruding ribs abutting said guide rails to guide the bottom shield when securing said bottom shield and said front case.

15. The monitor according to claim 14, further comprising supporting member means having an upper surface for supporting the cathode ray tube thereon, said supporting member means being spaced away from the snap member means and protruding from said front case.

16. The monitor according to claim 14, wherein surfaces slanted at a predetermined angle are formed on sides of the protruding ribs so that, when said snap member means are inserted into the through holes, inner peripheries of the guide rails abut the slanted surfaces, thereby facilitating securing of the bottom shield and the front case.

17. The monitor according to claim 14, wherein said bottom shield comprises a printed circuit board and a metal bracket for receiving the printed circuit board therein.

18. The monitor according to claim 14, wherein said bottom shield comprises a printed circuit board and a metal bracket for receiving the printed circuit board therein.

19. A monitor comprising:

a front case having a rear side and a rear portion;

a cathode ray tube installed at the rear portion of the front case;

a bottom shield having through holes formed at corner locations thereon; and snap member means protruding from the rear side of the front case and insertable into said through holes for securing the bottom shield and the front case;

wherein said supporting member means comprises a vertical plate and a horizontal plate directly contacting the cathode ray tube, said horizontal plate being connected to said vertical plate.

20. The monitor according to claim 19, further comprising supporting member means having an upper surface for supporting the cathode ray tube thereon, said supporting member means being spaced away from the snap member means and protruding from said front case.

21. The monitor according to claim 11, wherein said bottom shield comprises a printed circuit board and a metal bracket for receiving the printed circuit board therein.

22. A monitor comprising:

a front case having a rear side and a pair of guide rails extending rearward from corners on said rear side thereof;

a cathode ray tube installed at the rear side of the front case;

supporting member means having support surfaces for supporting the cathode ray tube thereon, said supporting member means protruding from the corners on the rear side of the front case; and a bottom shield having protruding rib means formed thereon for abutting said guide rails and guiding the bottom shield when said bottom shield engages the front case;

wherein said bottom shield has through holes formed therein, and wherein said protruding rib means have slanted side surfaces formed thereon so that, when said front case and said cathode ray tube are engaged, inner peripheries of the guide rails abut the slanted side surfaces of the protruding rib means.

23. The monitor according to claim 22, wherein said supporting member means comprises a vertical plate and a horizontal plate connected to said vertical plate and directly contacting said cathode ray tube.

* * * * *